United States Patent [19]
Florjancic

[11] 3,733,811
[45] May 22, 1973

[54] PROCESS FOR THE FABRICATION OF A LINK CHAIN

[76] Inventor: Peter Florjancic, St. Martin-Strasse 12, Garmisch-Partenkirchen, Germany

[22] Filed: June 1, 1970

[21] Appl. No.: 42,039

[52] U.S. Cl. ................................59/35, 59/84, 59/90
[51] Int. Cl. ..............................................F16g 15/12
[58] Field of Search..........................59/84, 35, 78, 90

[56] References Cited

UNITED STATES PATENTS 540,498   6/1895   Klatte.......................................59/84

FOREIGN PATENTS OR APPLICATIONS 830,567   3/1960   Great Britain............................59/35
1,045,744  12/1958  Germany...................................59/84
1,135,721  8/1962   Germany...................................59/84

*Primary Examiner*—Charles W. Lanham
*Assistant Examiner*—Gene P. Crosby
*Attorney*—Kemon, Palmer and Estabrook

[57] ABSTRACT

Link chain is made by forming links of fiber-reinforced thermoset plastic, the fiber reinforcement of each link being wound over a mould hung in a previously fabricated link after which the polymerizable impregnating resin, e.g., polyester, is cured to form the link which has no welding seams or the like. Moulds for winding and moulding of the links may be provided with teeth, indents or the like upon which a driving device may act to rotate the mould to wind the reinforcing fiber through a preformed link. High-grade chains having strength surpassing that of welded steel link chain can be produced.

13 Claims, 6 Drawing Figures

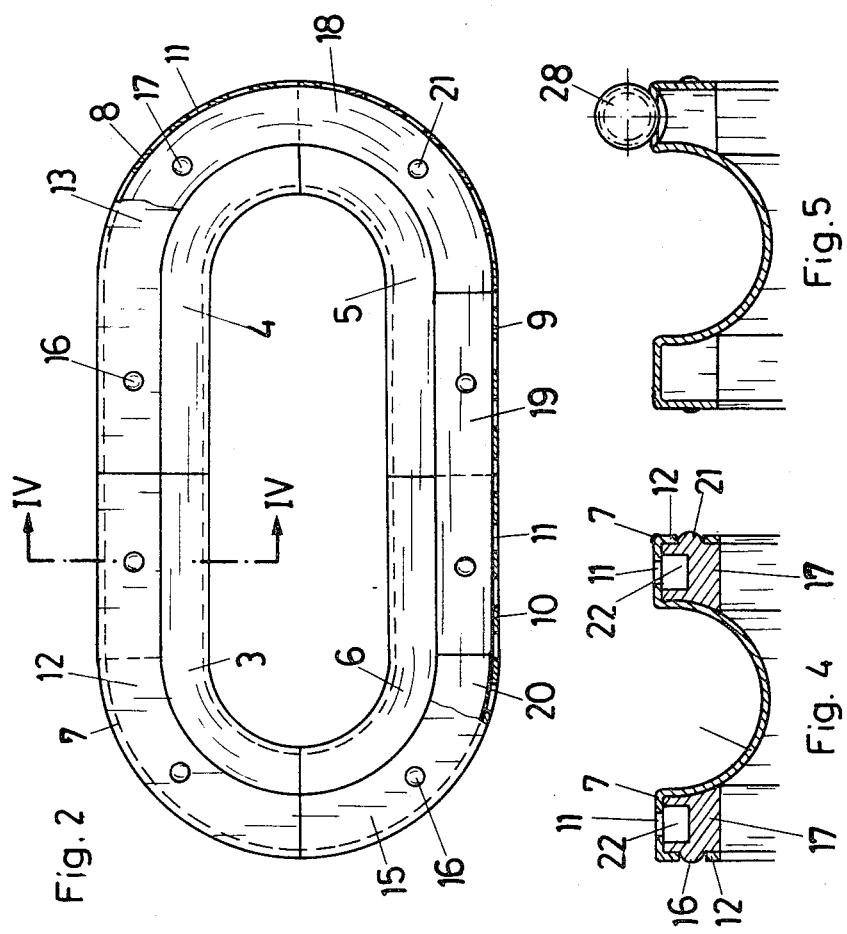

PROCESS FOR THE FABRICATION OF A LINK CHAIN

This invention relates to a process for the fabrication of a link chain and a device for carrying out this process.

Link chains have been fabricated so far of metallic materials by forging and welding. A disadvantage of these chains lies in that highly strong materials are difficult to be welded or cannot be welded at all and that the welding area is frequently weaker than the rest of the link. Moreover, steel chains are rapidly subject to corrosion, particularly in sea-water.

Furthermore, plastics chains are known which are produced by extruding the links. However, the plastics materials adapted to be extruded known as yet are only of moderate strength, which is still strongly decreased with the extrusion conditions changing only slightly, particularly with changes of temperature.

This invention relates to a process for the fabrication of highly strong, corrosion-resistant link chains and is characterized in that each link of fibrous material is wound over a mould hung in a previously fabricated link. Thus the links may be fabricated of a material covering a wide range of requirements. Pure and glass-fiber reinforced polyester resin may be used, which makes possible the fabrication of chains with a strength surpassing that of weldable steel. Furthermore, it is possible to add materials, for example by imprenation of the reinforcing fibers, which avoid the deposit of sea-weed, or improve the gliding properties of the chain by their lubricating effect.

A particular advantage of the process according to the invention as against known methods consists in that defects such as shrinkage, slag inclusion, cannot occur inside the link and that even the sectional formation can be constantly controlled. Thus the process is particularly adapted for the fabrication of high-grade chains.

The wound link can be made more solid by delayed impregnation with a binding agent. However, the thread is preferably soaked or coated with a curing agent before it is wound; curing may be accelerated by warming the link after winding. The wound link may also be subject to chemical treatment to be given the desired properties as to surface, strength etc.

The process of the invention makes possible the fabrication of links of triangular form in a simple way; thus with chain branchings, the connecting links are unobjectionably adjacent without squeezing each other.

Though, in principle, it is possible to carry out the winding process by a kind of shuttle, in a preferred method of the invention comprises supplying the fibrous material from an essentially constant direction and to put the mould into rotation, the plane of rotation coinciding with the plane of the link. By "rotation" any angular motion is meant; according to the shape of the links additional translatory movements are necessary to pass them through the previously fabricated link.

The mould is preferably provided all around with ledges, teeth or the like, upon which a driving device can act.

The mould is preferably four-part and consists of stamped plate, the four parts being fixed in their correct mutual position by locking pieces after introducing them in the previously fabricated link. After the winding process this mould may be disassembled and used again. It is also possible to extrude the mould round the previously fabricated link. After the winding process the mould can be removed by breaking or chemical dissolution or can be left in the link as a kind of dead mould, only the ledges, teeth or the like serving for the drive being preferably removed. In both cases, it is convenient to provide predetermined breaking points to ensure breaking at the desired point. To leave the mould in the link offers the advantage that unobjectionable areal contact is obtained between the links and that the mould can be produced of particularly wear-resistant and/or lubricating material. By leaving the mould in the link particular measures to avoid the joining of the winding material with that of the mould are unnecessary.

In order to put the threads into position a known guiding device for the thread can be provided with a reciprocating movement transversely to the thread direction. In order to protect the thread or to possibly impregnate it, the mould may also carry out a corresponding movement.

Embodiments of the invention are hereinafter described in greater detail with reference to the accompanying drawings without being limited to them.

FIGS. 2, 3 and 4 show the mould in three views, partly in section.

Figure 1:
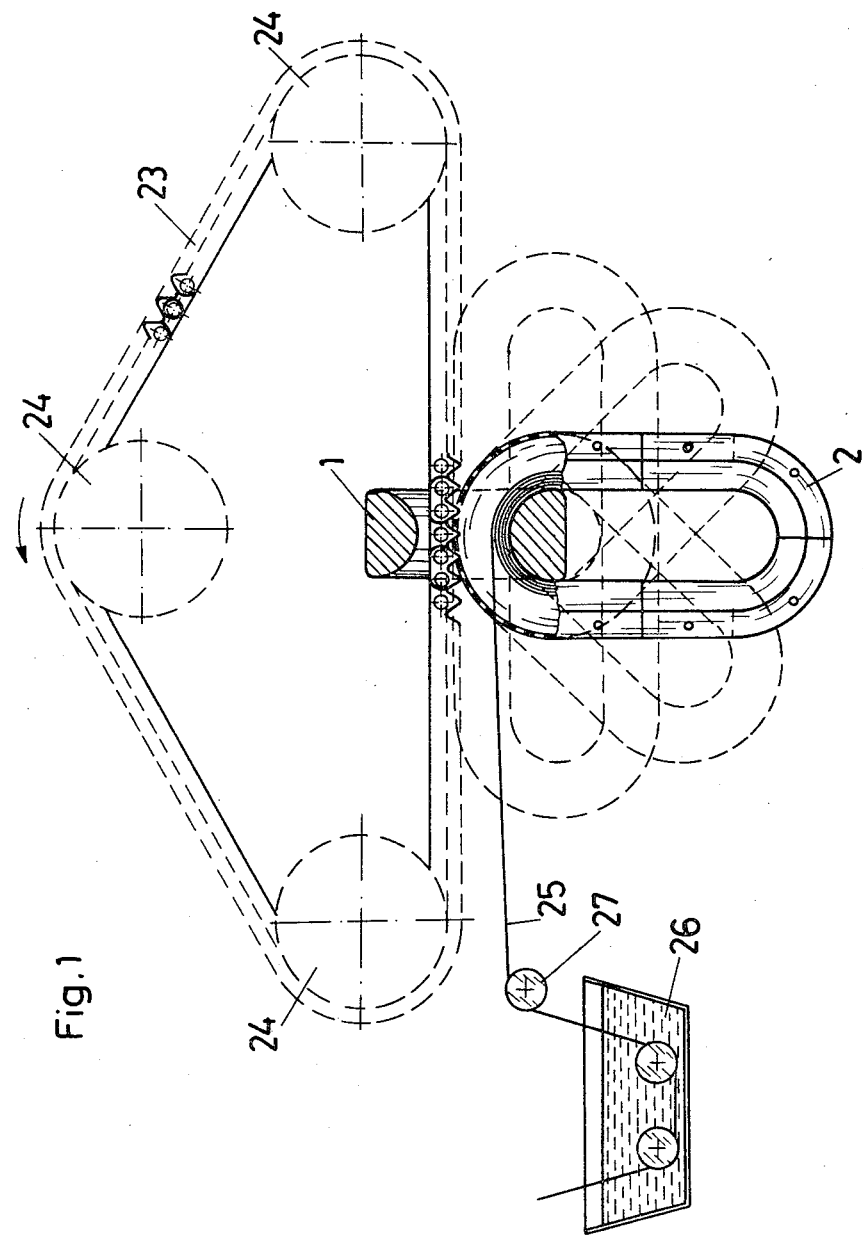
FIG. 1 is a diagrammatic view of a winding device with the use of a toothed chain.

FIGS. 5, and 6, show other drive embodiments for rotating the mould.

FIG. 1 shows a previously fabricated chain link 1 in section. The section is limited by an arc of circle and a straight line which pass into one another in a rounded part. Chain links with this section are particularly appropriate for the fabrication according to the process of invention; moreover, they have largely areal contact. The link 1 is held in the shown position by a clamping device not shown.

A mould 2 is hung in the link 1, details of this mould being illustrated in FIGS. 2, 3 and 4. Thus the actual mould consists of stamped and pressed plate, i.e., of four equal parts 3, 4, 5 and 6 with semicircular section. Ledges 7, 8, 9 and 10 with rectangular recesses 11 in equal distances extend at the outer edge of the four mould parts 3, 4, 5 and 6 perpendicularly to the plane of the link A. They are joined by ledges 12, 13, 14 and 15 in parallel to the plane of the link at the edges of the ledges 7, 8, 9 and 10 facing away from the mould parts, said ledges 12, 13, and 15 being provided with bores 16.

The four mould parts 3, 4, 5 and 6 may be fixed in their mutual position by equal pairs of locking blocks 17, 19 or 18, 20. Each locking block is provided with spherical projections 21 which engage in the bores 16 of the ledges 12, 13, 14 and 15 under resilient deformation of the latter. Below the recesses 11 of the ledges 7, 8, 9 and 10, the locking blocks are provided with bores 22.

The mould 2 is driven over a toothed chain 23 (FIG. 1) whose teeth engage in the recesses 11 of the ledges 7, 8, 9 and 10. The endless toothed chain 2 is guided over three rolls 24, one of which is driven. The mould 2 takes on the positions shown in dash-lines, one after another.

The thread 25 wound off a roll (not shown) is led through impregnation bath 26 and supplied to the mould 2 over a guide roller 27. The guide roller 27 may have the form of a guiding device for the thread 25 in a known way by being displaceable in direction of its axis and being given a reciprocating movement by a transmission connected with the drive of the toothed chain 23.

The essentially equal speed of the thread results in good homogeneity of the link. In the described arrangement the speed only remains completely equal towards the end of the winding process. However, it is possible to obtain a constantly equal speed of the thread by means of a corresponding control device which increases the drive speed as a function of the thickness of the previously wound layer on passing the bends. The ledges 7, 8, 9 and 10 may be displaced farther inside, which results in a smaller speed at the beginning of the winding process on passing the bends and in a somewhat higher speed of the thread towards the end of the winding process as compared to the linear parts of the mould. Alternately the mould can also be driven over a front surface, for example by means of recesses in the ledges 12, 13, 14 and 15.

As shown in FIG. 5, the drive may also occur over a worm 28, wherein the ledges 7, 8, 9 and 10 with their recesses 11 extending obliquely in this case act as oval worm gear. FIG. 6 shows a further embodiment, namely with a gear 29 which is mounted on a wing 30.

Changes may be made in various respects and within the scope of the appended claims without departure from the broad aspects of the invention.

This holds particularly true for the mould. Thus snap or other connections may be directly attached to the mould, which renders the locking blocks unnecessary. Other materials, particularly adapted to be extruded, can be used in lieu of pressed plate.

What I claim is:

1. A method for the manufacture of link chain formed of links made of fiber-reinforced resin material which comprises:
   a. providing a mold that is substantially semi-circular in cross-section whereby reinforcing fiber may be fed onto the mold in uniform manner over the entire cross-section, said mold being comprised of at least two parts,
   b. assembling the parts of said mold relative to a previously fabricated chain link so the mold hangs in said previously fabricated chain link,
   c. winding fibrous material from an external source onto said mold by turning the mold in a plane perpendicular to the longitudinal centerline of said previously fabricated chain link,
   d. controlling said turning of the mold to provide substantially constant speed of travel of the fibrous material in its winding onto the mold, and
   e. continuing said winding until said mold contains a uniform assembly of fibrous material substantially semi-circular in cross-section.

2. The method of claim 1 wherein said mold is turned by contact of said mold with driving means substantially at the position of the mold where said fibrous material being wound in said step "c" makes tangential contact.

3. The method of claim 2 wherein said driving means is a toothed chain that passes through said previously fabricated chain link and said mold has edge recesses that receive teeth of said toothed chain.

4. The method of claim 2 wherein said fibrous material is impregnated with curable binding agent before winding onto said mold.

5. The method of claim 4 wherein said fibrous material is a thread of glass fibers and said binding agent is polyester resin.

6. Apparatus for fabricating link chain formed of links made of fiber-reinforced resin material which comprises:
   A. A mold substantially semi-circular in cross-section whereby reinforcing fiber may be fed onto the mold in uniform manner over the entire cross-section, said mold being comprised of at least two parts,
   B. means to deliver a fibrous strand from a source of supply in a path of substantially constant direction tangentially onto the internal surface of said mold, and
   C. means to turn said mold in a plan perpendicular to the plane of the longitudinal centerline of a previously fabricated chain link in which said mold is hung while the previously fabricated chain link is held so said plane of its longitudinal centerline intercepts said fibrous strand path.

7. The apparatus of claim 6 wherein said means "C" comprises a toothed chain which passes through said previously fabricated chain link and said mold has edge recesses that receive teeth of said toothed chain.

8. Apparatus as claimed in claim 6 wherein the outer periphery of the mold is provided with cylindrical ledges extending perpendicularly to the plane of the link being fabricated.

9. Apparatus as claimed in claim 6 wherein the outer lateral surfaces of the mold are provided with flat ledges extending substantially parallel to the plane of the link.

10. Apparatus as claimed in claim 9 wherein said ledges are provided with a plurality of bores and including locking blocks having projections which engage in the bores of said ledges to retain said mold parts in assembled relation.

11. Apparatus as claimed in claim 6 wherein the mold has ledges provided with recesses and wherein means for turning said mold is provided in the form of at least one movable, toothed chain, the teeth of which are engageable in said recesses.

12. Apparatus as claimed in claim 6 wherein the mold has ledges provided with recesses and wherein means for turning said mold are provided in the form of at least one gear, the teeth of which are engageable in said recesses.

13. Apparatus as claimed in claim 6 wherein the mold has ledges provided with recesses and wherein means for turning said mold are provided in the form of at least one worm gear, the threads of which are engageable in said recesses.

* * * * *